(12) United States Patent
Mark et al.

(10) Patent No.: US 11,701,710 B2
(45) Date of Patent: Jul. 18, 2023

(54) SYSTEM, APPARATUS, AND METHODS FOR MANAGING SINTERING SUPPORTS

(71) Applicant: MARKFORGED, INC., Watertown, MA (US)

(72) Inventors: Gregory Thomas Mark, Newton, MA (US); Christopher Hoffman, Watertown, MA (US); Benjamin Hodsdon Gallup, Acton, MA (US); Maxim Seleznev, Belmont, MA (US); Michelle Ling Chao, Somerville, MA (US)

(73) Assignee: MARKFORGED, INC., Waltham, MA (US)

( * ) Notice: Subject to any disclaimer, the term of this patent is extended or adjusted under 35 U.S.C. 154(b) by 0 days.

(21) Appl. No.: 17/145,695

(22) Filed: Jan. 11, 2021

(65) Prior Publication Data

US 2021/0213534 A1 Jul. 15, 2021

Related U.S. Application Data

(60) Provisional application No. 62/959,546, filed on Jan. 10, 2020.

(51) Int. Cl.
| | |
|---|---|
| *B22F 10/40* | (2021.01) |
| *B22F 10/14* | (2021.01) |
| *B22F 10/68* | (2021.01) |
| *B33Y 10/00* | (2015.01) |
| *B22F 10/43* | (2021.01) |
| *B22F 10/64* | (2021.01) |

(Continued)

(52) U.S. Cl.
CPC ............. *B22F 10/14* (2021.01); *B22F 10/43* (2021.01); *B22F 10/64* (2021.01); *B22F 10/66* (2021.01); *B22F 10/68* (2021.01); *B33Y 10/00* (2014.12); *B33Y 30/00* (2014.12)

(58) Field of Classification Search
CPC .... B22F 3/003; B22F 3/10; B22F 3/14; B22F 3/15; B22F 3/16; B22F 2003/1042; B22F 10/10; B22F 10/14; B22F 10/16; B22F 10/40; B22F 10/64; B22F 3/1017; B22F 3/1021; B22F 3/1042
See application file for complete search history.

(56) References Cited

U.S. PATENT DOCUMENTS

| | | | |
|---|---|---|---|
| 5,745,834 A * | 4/1998 | Bampton | B22F 1/0059 419/37 |
| 6,508,980 B1 * | 1/2003 | Sachs | B22F 10/10 419/36 |
| 7,418,993 B2 | 9/2008 | Frasier et al. | |

(Continued)

*Primary Examiner* — Michael P Wieczorek
(74) *Attorney, Agent, or Firm* — Lando & Anastasi, LLP

(57) ABSTRACT

Systems, apparatus and methods of additively manufacturing objects are disclosed. Specifically, provided herein are methods of heating objects having a particle-based support at least partially surrounding the object during portions of stages of the heating. Additionally, systems, apparatus, and methods for removing the particle-based support during heating, such that the object can continue heating to form a final part. Systems, apparatus, and methods for distributing the particle-based support to shore the objects through heating are disclosed. Systems, apparatus, and methods for removing the particle-based support are also disclosed herein.

30 Claims, 2 Drawing Sheets

(51) Int. Cl.
    *B22F 10/66*     (2021.01)
    *B33Y 30/00*     (2015.01)

(56) References Cited

U.S. PATENT DOCUMENTS 8,082,976 B2 * 12/2011 Frasier .................. B29C 64/165
                                                    164/335
2018/0243826 A1 * 8/2018 Okamoto ............ C04B 35/6264

* cited by examiner

SYSTEM, APPARATUS, AND METHODS FOR MANAGING SINTERING SUPPORTS

CROSS-REFERENCE TO RELATED APPLICATIONS

This application claims priority under 35 U.S.C. § 119(e) to U.S. Provisional Application Ser. No. 62/959,546, titled "System, Apparatus, And Methods for Managing Sintering Supports" filed Jan. 10, 2020, the disclosure of which is incorporated herein by reference in its entirety for all purposes.

SUMMARY

In accordance with an aspect, there is provided a method of additively manufacturing a three-dimensional object. The method may include providing a part comprising a model material and one or more binder components within a volume of a heating apparatus. The method may include adding a particle-based support to the volume such that the part is at least partially surrounded. The method further may include heating the part to a first temperature. The method may additionally include removing the particle-based support from about the part.

In further aspects, the method may include heating the part to a second temperature such that the three-dimensional object is formed.

In some aspects, heating to the first temperature includes forming necks to connect neighboring particle surfaces of the model material such that a pre-sintered object is formed.

In some aspects, the model material may include sinterable particles. In some aspects, the first temperature may be an initial sintering temperature of the model material. In some aspects, the model material may be characterized by a melting temperature that is lower than a melting temperature of the particle-based support.

In some aspects, adding the support may include depositing the support in the volume such that the particle-based support at least partially surrounds the part to fill gaps, overhangs, cantilevered portions, and/or unsupported ranges or spans of the part. In further aspects, the method may include supporting, with the particle based support, the cantilevered portions, gaps, overhangs, and/or unsupported ranges or spans of the part against deformation. For example, supporting the cantilevered portions, gaps, overhangs, and/or unsupported ranges or spans of the part against deformation may include supporting against sagging, slumping with gravity under a weight of the object, or combinations thereof. In some aspects, the depositing may include at least one of pouring, spreading, or rolling. In further aspects, the depositing may include vibrating or shaking the volume.

In some aspects, the model material includes metal particles. In some aspects, the one or more binder components includes a polymer-based binder. In some aspects, the particle-based support is a ceramic. For example, the particle-based support may be $Al_2O_3$.

In some aspects, adding the particle-based support to the volume may allow for the particle-based support to occupy a volume between a surface of a build chamber and an opposing unsupported surface of the part or to occupy a volume between a supported surface of model material and an opposing unsupported surface of model material.

In further aspects, the method may include applying a flow of a gas to the particle-based support at a flow rate lower than a force needed to fluidize the particle-based support. The flow of gas may be applied to the particle-based support during heating to the first temperature.

In further aspects, the method may include fluidizing the particle-based support around the part such that the particle-based support provides a buoyant force to the part. For example, fluidizing the particle-based support may occur following the onset of the necks connecting neighboring particle surfaces of the model material.

In further aspects, the method may include removing the three dimensional object from the particle-based support in the volume. In particular aspects, removing the particle-based support may include vacuuming the particle-based support out of the volume. In further aspects, removing the particle based support may include vibrating the particle-based support from about the pre-sintered object. In further aspects, removing the particle-based support may include propelling the particle-based support from about the pre-sintered object. For example, propelling the particle-based support may include applying a compressed gas to the particle-base support.

In further aspects, the method may include receiving, with holes and/or ports positioned in a base of the volume, used particle-based support. In particular aspects, the method further may include collecting, using a secondary chamber, receptacle, repository, or cistern positioned beneath or adjacent to the volume and in communication with the holes and/or ports positioned in the base of the volume, used particle-based support.

In some aspects, the particle-based support comprises a pliable particle-based support. Heating to the first temperature may include softening the pliable particle-based support such that it compresses between the part's cantilevered portions, gaps, overhangs, and/or unsupported ranges or spans when pressure is applied by the part at about the first temperature.

In some aspects, heating to the first temperature may result in the evaporation of the particle-based support. In some aspects, heating to the first temperature may result in the sublimation of the particle-based support. In some aspects, heating to the first temperature may result in the crumbling of the particle-based support between the object's cantilevered portions, gaps, overhangs, and/or unsupported ranges or spans when pressure is applied by the object at about the sintering temperature.

In some aspects, adding a particle-based support may include adding a particle-based release material. Heating to the first temperature may result in the powderizing of the particle-based release material.

In accordance with an aspect, there is provided a system for additively manufacturing a three-dimensional object. The system may include a furnace defined by a volume in which a part comprising a model material can be heated. The system further may include a particle-based support disposed within the volume and configured to at least partially surround and provide support for the part positioned in the volume. The system may additionally include at least one port integrated within the volume for removing the particle-based support.

In some aspects, the particle-based support may occupy a volume between a surface of a build chamber and an opposing unsupported surface of the part or may occupy a volume between a supported surface of the model material and an opposing unsupported surface of the model material.

In some aspects, the particle-based support, when heated, does not densify as the part is heated.

In further aspects, the system may include a secondary chamber, receptacle, repository, or cistern in communication with the volume through the at least one port. The secondary chamber, receptacle, repository, or cistern is separated from the furnace or a component thereof by a sliding door, a sliding hatch, movable closure, or a screen having a plurality of coverable openings therethrough. In particular aspects, the screen is recessed from the volume.

In further aspects, the system may include a blower. In some aspects, the blower may be configured to apply a gas to the particle-based support following formation of a pre-sintered part at a flow rate sufficient to fluidize the particle-based support. In some aspects, the blower may be configured to apply a gas to the particle-based support following formation of the three-dimensional object for removal of the particle-based support from the three-dimensional object.

In further aspects, the system may include a source of a vacuum. For example, the at least one port may include one or more vacuum holes.

In some aspects, the particle-based support may be a ceramic. In certain aspects, the ceramic is $Al_2O_3$. In further aspects, the part may include a binder. In particular aspects, the model material may include metal particles and the binder may include a polymer-based binder.

In further aspects, the system may include a gimbal configured to rotate a pre-sintered object.

The present disclosure provides methods of additively manufacturing three-dimensional objects. In some aspects, methods include heating three-dimensional objects. In some aspects, methods include supporting three-dimensional objects during heating. In some aspects, methods include supporting and/or shoring three-dimensional objects during heating of the objects and toward formation of a final three-dimensional object.

In some aspects, methods include, for example, supporting three-dimensional objects with temporary structures. In some aspects, methods include, supporting three-dimensional objects, in particular, supporting cantilevered portions, gaps, overhangs, and/or unsupported ranges or spans of such three-dimensional structures during heating of the objects and toward formation of a final three-dimensional object. In some aspects, methods include, supporting cantilevered portions, gaps, overhangs, and/or unsupported ranges or spans during heating and toward formation of a final three-dimensional object without inducing strain or stress that could cause a final three dimensional object, for example, to break, crack, fracture, warp, or otherwise sinter with a suboptimal shape.

In some aspects, methods include manufacturing an object, for example, from model material and one or more binder components. In some aspects, methods include manufacturing the object from model material that includes sinterable particles. In some aspects, the model material includes ceramic particles, metal particles, or combinations thereof. In some aspects, the particles may include, for example, aluminum, copper, stainless steel, titanium, among others. In some aspects, the particles can include any commercially valuable metal suitable for printing including, for example, any metals resistant to oxidation at both high and low temperatures, such as amorphous metals, glassy metals, or metallic glass.

In some aspects, methods include manufacturing the object from one or more binder components including a polymer-based binder. In some aspects, at least one of the one or more binder components is characterized by a high melting temperature. In some aspects, the at least one or more high melting temperature binder components is such that it is resistant to at least some solvents and/or not catalytically responsive below 100° C. and/or below 200° C.

In some aspects, the one or more binder components include, for example, polyethylene.

The present disclosure encompasses a recognition that model material is heavy and/or dense and that during processing of additively manufactured three-dimensional objects toward a final object, such heavy and/or dense material could cause deformation, sagging, slumping with gravity, or warping. The present disclosure also encompasses a recognition that without supporting and/or shoring structures such heavy and/or dense model material could cause breaking, cracking, fracture, or warping within the object when model material is processed into its final part.

The present disclosure further encompasses a recognition that until formed into a final part, unprocessed model material may want for additional support. That is, the present disclosure encompasses a recognition that in part because the model material as disclosed is particularly dense and/or heavy that an object during processing may want for additional support and/or shoring to avoid and/or minimize deformation, sagging, slumping with gravity, or warping. Moreover, the present disclosure encompasses a recognition that an object may want for additional support and/or shoring to avoid and/or minimize breaking, cracking, fracture, or warping within the object when model material is processed into its final part.

Supports and/or shoring structures may be added during processing to maintain, preserve, and/or retain an additively manufactured object's formed and/or desired shape. That is, for example, to preserve an additively manufactured object's shape, adding a supporting structure and/or shoring structure would be helpful. In some embodiments, such a structure is temporary and/or removable.

In some embodiments, a removable, soluble, and/or dispersing support may prevent, minimize, or be helpful to reduce deformation, sagging, slumping with gravity, or warping. In some embodiments, such structures are removable, soluble, and/or dispersing during processing of the additively manufactured objects. In some embodiments, a removable, soluble, and/or dispersing support may prevent, minimize, or be helpful to reduce breaking, cracking, fracture, or warping within the object when model material is processed into its final part. In some embodiments, such structures are removable, soluble, and/or dispersing after final parts are formed.

Additionally, the present disclosure encompasses a recognition that in additively manufactured objects, there are unique, specially designed elements and features including those that extend outward, curb inward; including cantilevered portions; jutting portions; breaks, gaps, overhangs, or windows within the model material that as above explained for the above identified reasons, until processed into a final part may want for additional support.

In some embodiments, supports and/or shoring structures may be useful or helpful and may be added during processing to maintain, preserve, and/or retain an additively manufactured object's unique, specially designed elements and features including those that extend outward, curb inward; including cantilevered portions; jutting portions; breaks, gaps, overhangs, or windows. In some embodiments, such structures are temporary and/or removable.

In some aspects, removable, soluble, and/or dispersing supports and/or shoring structures remain in place until a final part is complete. In some aspects, removable, soluble, and/or dispersing supports remain in place at least until a pre-sintered part is complete. In some aspects, a final part and a pre-sintered part are complete when an additively manufactured object possesses sufficient internal strength. In some aspects, an additively manufactured object possesses sufficient internal strength when the additively manufacture object retains its printed shape without supports. In some aspects, removable, soluble, and/or dispersing supports remain in place at least until an additively manufactured object possesses such internal strength that the model material retain their printed (i.e., desired) shape without these supports.

In some aspects, removable, soluble, and/or dispersing supports and/or shoring structures are made of and/or formed model material. In some aspects, removable, soluble, and/or dispersing supports and/or shoring structures are made of and/or formed from a model material. In some aspects, the model material supports include ceramic, metal, or combinations thereof.

In some aspects, removable, soluble, and/or dispersing supports and/or shoring structures are made of and/or formed from a release material. In some aspects, release material supports include, for example, a ceramic or metal particles that have a higher melting temperature than that of the model material. In some aspects, for example, the release material may powderize at model material sintering temperatures. In some aspects, for example, the release material does not sinter at model material sintering temperatures. That is, for example, at the model material sintering temperatures, release material particles fall apart (i.e., powderized) into without sintering.

In some aspects, as disclosed removable, soluble, and/or dispersing supports and/or shoring structures are particle-based supports. In some aspects, particle-based supports are removable. In some aspects, particle-based supports can be removed during heating a heating process. In some aspects, particle-based supports are movable during heating a heating process. In some aspects, the particle-based support that is movable or removable may be made of and/or includes a material characterized by a melting temperature that is higher than a melting temperature of the model material. In some aspects, the model material is characterized by a melting temperature that is lower than a melting temperature of the particle-based support. In some aspects, the particle-based support is made of and/or includes a ceramic, metal, or combinations thereof. In some aspects, the particle-based support is made of and/or includes, for example, alumina ($Al_2O_3$), beryllia, molybdenum silica, titania, etc.

In some aspects, particle-based supports may be removed from about the object when a pre-sintered object is formed. In some aspects, the pre-sintered object is formed during heating, when necks form to connect neighboring particle surfaces of the model material. As above explained, once a pre-sintered object is formed, the additively manufactured object possesses sufficient internal strength such that it retains its printed shape without supports. During model material sintering, however, with further increasing temperature, in some aspects the bulk density of both the model material and the particle-based support increases, whereby the object shrinks. While not wishing to be bound to a specific theory, it is believed that when the object shrinks with supports in place, a risk that supported features, for example fine features; windows; openings; cantilevered portions; gaps; overhangs; etc. of the object can be or can become particularly susceptible break, crack, fracture, warp, or combinations thereof. In some aspects, due at least in part to factors, including, for example particle size, shape, volume fraction, mismatch of the coefficients of thermal expansion of the model material and the particle-based support, among other factors, fine features; windows; openings; cantilevered portions; gaps; overhangs; etc. of the object can be or can become particularly susceptible break, crack, fracture, warp, or combinations thereof. In some aspects, particles can be removed after the object possesses sufficient internal strength such that it retains its printed shape without supports. In some aspects, removal of particles at this time can also relieve this susceptibility of the object to break, crack, fracture, warp, or combinations thereof.

Additionally, in some aspects, particle-based supports can be designed and engineered such that particles do not need to be removed during heating. In some aspects, particle-based supports are designed and engineered, to change with conditions such that the particle-based supports can provide supporting and/or shoring structure until a pre-sintered object is formed. In some aspects, the particle-based supports change, for example, via a designed or engineered change, such that they no longer interfere, cause, or increase an object's susceptibility to break, crack, fracture, warp, or combinations thereof.

That is, in some aspects, particle-based supports are designed and engineered, for example, where their associative, chemical, mechanical, and/or physical properties change due to a stimulus (e.g., such as temperature). In some aspects, mechanical properties of the particle-based support change for example from rigid to soft. In some aspects, for example, when a particle-based support changes from rigid to soft at or about a temperature the particle-based support is design and engineered to compress when it is exposed to stress or strain from compression (e.g. pressure when the pre-sintered object shrinks). In some aspects, the particle-based support evaporates at or as it approaches a temperature. In some aspects, the particle-based support sublimates at or as it approaches a temperature. In some aspects, for example, when a particle-based support evaporates or sublimates at or about a temperature the particle-based support is design and engineered to disperse and/or sufficiently disperse such that there is little stress or strain from compression (e.g., pressure when the pre-sintered object shrinks). In some aspects, mechanical properties of the particle-based support change for example from rigid and/or resilient to brittle. In some aspects, for example, when a particle-based support changes from rigid and/or resilient to brittle at or about a temperature the particle-based support is design and engineered to crumble when it is exposed to stress or strain from compression (e.g., pressure when the pre-sintered object shrinks).

In some aspects, the particle-based support is configured to shore against part deformation, sagging, slumping with gravity, or combinations thereof when at least a portion of the model material is unsupported. In some aspects, methods include a particle-based support that may be sized, designed and configured such that when the particle-based support is deposited in a volume, the particle-based support at least partially surrounds the object to fill any of the object's unsupported spans, gaps, overhangs, and/or cantilevered portions. In some aspects, the particle-based support shores the object's cantilevered portions, gaps, overhangs, and/or unsupported ranges or spans against deformation. In some aspects, the particle-based support shores against sagging, slumping with gravity under a weight of the object, or combinations thereof. In some aspects, the particle-based support occupies a volume between a surface of a build chamber and an opposing unsupported surface of the part. In some aspects, the particle-based support occupies a volume between a supported surface of model material and an opposing unsupported surface of model material.

In some aspects, methods of additively manufacturing an object can include introducing particle-based supports to at least partially surround an object within a volume. In some aspects, as above explained, an additively manufactured object is heated or to be heated within a volume. In some aspects, a volume includes a heating apparatus. In some aspects, an object is heated within the heating apparatus. In some aspects, the heating apparatus includes a furnace. In some aspects, the heating apparatus is a part of a build chamber. In some aspects, the heating apparatus is connected to, in-line with, or in a production line with a build chamber.

In some aspects, methods include prior to the step of heating, depositing the particle-based support in a volume for holding an object. In some aspects, methods of adding particle-based support to a volume for holding an object can include, for example: pouring, spreading, and/or rolling. In some aspects, methods of adding particle-based support to a volume can further include vibrating the volume. In some aspects, methods of adding particle-based support to a volume can further include shaking the volume. In some aspects, methods of adding particle-based support to a volume are such that an object and/or part is substantially surrounded by the particle-based support. In some aspects, methods of adding particle-based support to a volume are such that an object and/or part is immersed by the particle-based support.

In some aspects, methods include heating an object being at least partially surrounded by a particle-based support. In some aspects, heating includes heating to a first temperature. In some aspects, a first temperature includes an initial sintering temperature for a model material. In some aspects, an initial sintering temperature for a model material is characterized such that when heated to the first temperature, necks form to connect neighboring particle surfaces of the model material so that a pre-sintered object is formed.

In some aspects, methods include removing the heat after the initial sintering temperature is reached. In some aspects, methods include removing the heat after the pre-sintered object is formed. In some aspects, methods include maintaining a temperature after the initial sintering temperature is reached (that is, maintaining the initial sintering temperature). In some aspects, methods include maintaining the initial sintering temperature after the pre-sintered object is formed. In some aspects, methods include maintaining a temperature ramp rate after the pre-sintered object is formed. In some aspects, methods include maintaining a temperature ramp rate after the initial sintering temperature is reached. In some aspects, methods include adjusting the temperature and/or temperature ramp rate after the pre-sintered object is formed. In some aspects, methods include adjusting the temperature and/or temperature ramp rate after the initial sintering temperature is reached.

In some embodiments, after heating methods can further include removing the particle-based support from about the pre-sintered object. In some aspects, removing the particle-based support from about the pre-sintered object includes vacuuming the particle-based supports from the volume. In some aspects, removing the particle-based support from about the pre-sintered object includes propelling the particle-based supports from the volume. In some aspects, removing the particle-based support from about the pre-sintered object includes accessing the volume and relying on gravity for removal of the particle-based supports from the volume.

In some aspects, methods of removing the particle-based support from about the pre-sintered object include vacuuming the particle-based support out of the volume. In some aspects, methods including a step of vacuuming include a volume having a vacuum. In some aspects, a vacuum includes a vacuum knife.

In some aspects, methods of removing the particle-based support from about the pre-sintered object include propelling the particle-based support from about the pre-sintered object. In some aspects, methods including a step of propelling include a volume having a blower. In some aspects, methods including a step of propelling the particle-based support comprises a gas flow. In some aspects, the gas flow is directional. In some aspects, methods including a step of propelling a gas flow include a compressed gas. In some aspects, a compressed gas is inert.

In some aspects, methods of removing the particle-based support from about the pre-sintered object include holes and/or ports for receiving used particle-based support. In some aspects, the holes and/or ports for removing the particle-based support from about the pre-sintered object are positioned in a base of a volume. In some aspects, the ports and/or holes are connected to the vacuum. In some aspects, the ports and/or holes are positioned such that the base of volume can rely on or utilize gravity to expel the particle-based supports.

In some aspects, a secondary chamber, receptacle, repository, or cistern is located beneath or adjacent to the volume. In some aspects, a secondary chamber, receptacle, repository, or cistern is useful absorbing, receiving, or taking in the removed particle-based support. In some aspects, the holes and/or ports are in communication with the secondary chamber, receptacle, repository, or cistern. In some aspects, the volume and the secondary chamber, receptacle, repository, or cistern is separated by a door or a hatch. In some aspects, the door or hatch is a movable door or hatch. In some aspects, the volume and the secondary chamber, receptacle, repository, or cistern is separated by a screen. In some aspects, the screen is a movable screen. In some aspects, a door, hatch, screen, movable or otherwise may be recessed from the volume.

In some aspects, methods of removing the particle-based support from about the pre-sintered object include vibrating or shaking the particle-based support from about the pre-sintered object. In some aspects, vibrating or shaking the particle-based support from about the pre-sintered object allows the particle-based support to free itself and/or to be loosened or freed from about the pre-sintered object.

In some aspects, after removing the particle-based support from about the pre-sintered object, method further include heating the pre-sintered object to a second temperature. In some embodiments, heating can include continuing to heat the pre-sintered object to a sintering temperature of the model material to form a final part. Specifically, in some embodiments, methods of additively manufacturing an object include, heating an object to a first temperature, the object being at least partially surrounded by a particle-based support. Methods further include heating at the first temperature, so that necks connect neighboring particle surfaces of the object such that a pre-sintered object is formed. In some aspects, the pre-sintered object being characterized by a melting temperature that is higher than a melting temperature of the particle-based support. In some embodiments, methods further include removing the particle-based support from about the pre-sintered object. In some embodiments, methods further include heating the pre-sintered object at a second temperature such that the pre-sintered object is densified so that a final object is formed.

In some aspects, particle-based supports may be retained or substantially retained about the additively manufactured object after the pre-sintered object is formed. That is, in some aspects, the particle-based supports are designed and engineered such that particle-based supports do not need to be removed during heating. In some aspects, particle-based supports are designed and engineered, to change with conditions such that the particle-based supports vanish or do not structurally interfere with the object (i.e., cause stress or strain) after a pre-sintered object is formed. In some aspects, the particle-based supports change, for example, via a designed or engineered change, such that they no longer interfere, cause, or increase an object's susceptibility to break, crack, fracture, warp, or combinations thereof.

In some embodiments, after the pre-sintered object is formed, methods further include additively manufacturing an object including heating the object to a model material sintering temperature. In some aspects, the object is at least partially surrounded by a particle-based support that is designed and engineered such that at, about, or just above the initial sintering temperature of the model material the particle-based support transitions from rigid to soft. In some aspects, when at (about or just above) the model material's sintering temperature, the particle-based support is compressible relative to that of the model material. In some aspects, at (about or just above) the model material's sintering temperature, when a softer pliable particle-based support is positioned in a model material object's cantilevered portions, gaps, overhangs, and/or unsupported ranges or spans the softer pliable particle-based support compresses relative to the model material. In some aspects, the step of heating to the sintering temperature, the particle-based support softens such that it compresses between the object's cantilevered portions, gaps, overhangs, and/or unsupported ranges or spans when pressure is applied by the object. In some aspects, the object sinters at the sintering temperature to form a final part.

In some embodiments, after the pre-sintered object is formed, methods further include additively manufacturing an object including heating the object to a model material sintering temperature. In some aspects, the object is at least partially surrounded by a particle-based support that is designed and engineered such that at, about, or just above the initial sintering temperature of the model material the particle-based support transitions from rigid to brittle. In some embodiments, methods include additively manufacturing an object including heating the object to a sintering temperature. In some aspects, the object is at least partially surrounded by a particle-based support that crumbles when it is at (about or just above) a model material sintering temperature. In some aspects, when at the model material's sintering temperature, the particle-based support is brittle relative to that of the model material. In some aspects, at the model material's sintering temperature, when a more brittle particle-based support is positioned in a model material object's cantilevered portions, gaps, overhangs, and/or unsupported ranges or spans the more brittle particle-based support crumbles relative to the model material. In some aspects, the step of heating to the sintering temperature, the particle-based support crumbles between the object's cantilevered portions, gaps, overhangs, and/or unsupported ranges or spans when pressure is applied by the object.

In some embodiments, after the pre-sintered object is formed, methods further include additively manufacturing an object including heating the object to a model material sintering temperature. In some aspects, the object is at least partially surrounded by a particle-based support that is designed and engineered such that at, about, or just above the initial sintering temperature of the model material the particle-based support transitions such that it evaporates or sublimates. In some embodiments, methods include additively manufacturing an object including heating the object to a sintering temperature. In some aspects, the particle-based support is characterized in that it has an evaporation temperature, a melting temperature, or a sublimation temperature lower than a sintering temperature of the model material. In some aspects, the particle-based support is further characterized in that it has an evaporation temperature, a melting temperature, or a sublimation temperature higher than an initial temperature of the model material. In some aspects, the particle-based support evaporates, liquifies, and/or sublimates after initial sintering of the model material. That is, after the model material necks to form the pre-sintered object. In some aspects, the particle-based support is characterized in that it evaporates, liquifies or sublimates as the particle-based support approaches the sintering temperature of the object. In some aspects, the particle-based support is characterized in that it evaporates, liquifies or sublimates before the particle-based support reaches the sintering temperature of the object. In some aspects, a model material object's cantilevered portions, gaps, overhangs, and/or unsupported ranges or spans formed as a pre-sintered object before the support evaporates, liquifies, and/or sublimates.

In some embodiments, methods of additively manufacturing an object include, heating an object to a first temperature, the object being at least partially surrounded by a particle-based support; moving the object to a secondary heating apparatus to a second temperature; and sintering the object to the final part. In some aspects, methods of additively manufacturing an object include, heating an object to a first temperature, the object being at least partially surrounded by a particle-based support. Methods further include heating at the first temperature, so that necks connect neighboring particle surfaces of the object such that a pre-sintered object is formed. In some aspects, methods further include removing the pre-sintered object from the volume. In some aspects, methods further include heating the pre-sintered object at a second temperature such that the pre-sintered object is densified so that a final object is formed.

In some embodiments, methods of additively manufacturing an object include, heating an object to a sintering temperature, the object being at least partially surrounded by a particle-based support. In some aspects, the particle-based support being a release material characterized by a melting temperature that is higher than a melting temperature of the model material. In some embodiments, at the sintering temperature of the object, a final part is form and is surrounded by a powderized release material. In some embodiments, methods further include removing the powderized release material from about the final part.

The present disclosure provides systems for additively manufactured three-dimensional object. In some embodiments, systems include a heating apparatus defined by a volume in which a part is heated. In some aspects, a heating apparatus includes a furnace. In some aspects, the present disclosure further includes a particle-based support. In some aspects, the volume includes at least one port integrated therein for removing the particle-based support while heating the volume. In some aspects, systems include a secondary chamber, receptacle, repository, or cistern is positioned beneath or adjacent to the volume for receiving the particle-based support. In some aspects, systems include a secondary chamber, receptacle, repository, or cistern is positioned beneath or adjacent to the volume for receiving the particle-based support during heating. In some aspects, systems include a door or hatch in communication with secondary chamber, receptacle, repository, or cistern. In some aspects, systems include a slidable door or hatch to seal, close off, or isolate a secondary chamber, receptacle, repository, or cistern from a volume. In some aspects, systems include a slidable door or hatch to seal, close off, or isolate a secondary chamber, receptacle, repository, or cistern from a volume during heating. In some aspects, the slidable door or hatch is or includes a movable closure. In some aspects, the holes or ports include a screen having a plurality of openings therethrough. In some aspects, the holes or ports are recessed from the volume.

In some aspects, the volume includes a vacuum. In some aspects, the volume includes vacuum holes. In some aspects, the volume includes a vacuum wand or vacuum knife. In some aspects, the volume includes a blower. In some aspects, the volume includes a source of compressed gas.

In some aspects, the volume includes a gimbal configured to rotate a pre-sintered object. In some aspects, the gimbal is configured to aid in dislodging the particle-based support during a removal step. In some aspects, the volume includes an apparatus configured to vibrate a volume about a pre-sintered object. In some aspects, the volume includes an apparatus configured to shake a volume about a pre-sintered object. In some aspects, the apparatus for vibrating and/or shaking aids in particle-based support removal.

BRIEF DESCRIPTION OF THE DRAWINGS

The accompanying drawings are not drawn to scale. In the drawings, each identical or nearly identical component that is illustrated in the various figures is represented by a like numeral. For purposes of clarity, not every component may be labeled in every drawing. In the drawings.

DETAILED DESCRIPTION

Figure 1:
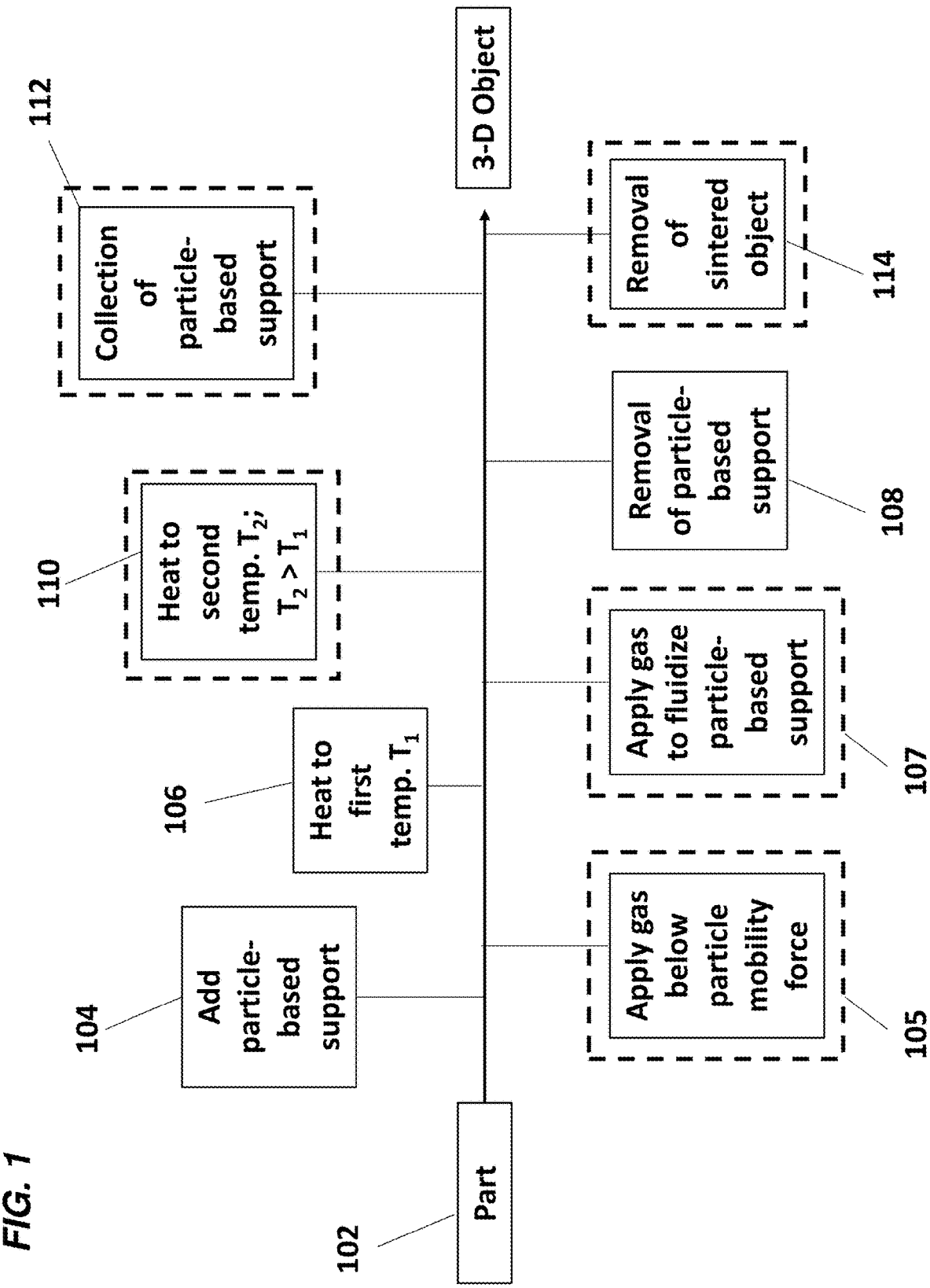
FIG. 1 shows a flow diagram of a method of producing a three-dimensional object from a part, according to one embodiment described herein.

Additive manufacturing systems, apparatus, and methods have been developed for constructing objects by building them up from feed materials. Extrusion and binderjet technologies, for example, among others, deposit various feed materials in a layer-by-layer manner. Layer-by-layer additive manufacturing processes construct three-dimensional objects horizontally, along an x-axis and y-axis and vertically, along a z-axis. With increasing capability, including, for example, printing apparatus size, enhanced software functionality, and improved speed, constructed objects have been and are rapidly expanding in their three-dimensional object size, their object complexity, and/or with regard to their feature size and/or complexity. Additionally, there is a wide and growing library of different and enhanced feed materials from which additive manufacturing apparatus can form and interchange to three-dimensionally build objects.

Such enhanced objects, feature sizes, and/or complexity of objects can present unique challenges for additive manufacturing techniques. Large and/or complex objects can include, for example, structural elements and features that extend outward, curb inward, have cantilevered portions, jutting portions, breaks, gaps, or windows within the model material, overhangs, among others. Each of these types of structural elements or features may have varying part tolerances to control with the manufacturing process. Additionally, some printed materials can present further challenges, for example, due to the printed material's density, a unique shape of a geometric feature, a geometric feature's specific local mass, a specific additive manufacturing process, or some combination thereof.

In at least one embodiment, a process of additively manufacturing an object includes, first, extruding or binderjet printing a model material to form a green body. The printed green body can include powdered or spherized metal (or ceramic) particles mixed with a binder or binders. In additive manufacturing, dense materials suitable for printing can include, for example: aluminum, copper, titanium and/or stainless steel and other metals.

Following completion of the printed green body, a brown body may subsequently be formed from the green body by removing one or more binders. One or more binders may be removed, for example, by a process such as using a solvent, by catalysis, or by pyrolysis. A brown body may retain its shape and resist impact better than a green body due to re-melting of a remaining binder. In other cases, a brown body may retain its shape but be comparatively fragile. Alternatively, a brown body may be formed including powdered or spherized metal (or ceramic) particles mixed with one or more binders.

Sintering of the brown body may take place in an inert atmosphere, an atmosphere including a reacting gas, a reducing atmosphere, or a vacuum atmosphere. When the brown body is sintered, for example at high temperature and/or pressure, any binder, remaining binder, or second stage binder may pyrolyze away, and the brown body substantially uniformly contracts as it sinters. Application of heat (and optionally pressure) may reduce (or eliminate) pores, voids, and microporosity between and within the metal (or ceramic) particles through diffusion bonding and/or atomic diffusion.

In additive manufacturing, printed parts having structural features that extend outward or that curb inward; have cantilevered portions, jutting portions, breaks, gaps, or windows within the model material, or overhangs may benefit from the inclusion of physical or mechanical supports. Indeed, without a benefit of placement of physical or mechanical supports such structural elements and features could deform, sag, slump with gravity, or a combination thereof. This deformation, sag, or slump can vary in severity, from a severe failure exhibiting visible warping or cracking to a less severe failure where a feature is slightly out of a specified tolerance.

Supports

Additive manufacturing of a sinterable object using a 3D printing material including a binder and a metal (or ceramic) sintering material, as disclosed herein, may be aided by support structures. Support structures may be useful in multiple circumstances, and the usefulness of these structures may vary and overlap with changing conditions, such as changing environmental and process conditions.

Green Body Supports

In extrusion-based printers, such green body support structures can be useful to resist downward pressure, e.g., downward force of an extrusion head, and to locate the deposited bead or other deposition in space. That is, such green-body support structures can be useful to provide temporary supports. Green body support structures may be removable, soluble, and/or dispersing during the building process.

Green body supports that are soluble and/or dispersing supports may be used to provide support for additive manufacturing processes. These green body supports may be additively manufactured from a catalytically responsive material, pyrolytic material, soluble material, thermal material, or combinations thereof, including, for example polymers or polymer blends. Following a removal process, e.g., solvent or dispersant process, green body supports may leave behind only removable byproducts, such as gases and/or dissolved materials.

Alternatively, green body supports may be printed of a composite, a matrix of a thermal, soluble, pyrolytic, or catalytic debindable material (e.g., catalytic including Polyoxymethylene-POM/acetal) and high melting point metal (e.g., molybdenum) or ceramic spheres. These green body matrix support structures may be designed and constructed to be mechanically, chemically, or thermally removed before or after debinding. As above noted, these matrix composites include a thermal, soluble, pyrolytic or catalytically responsive material, and thus may be fully removed during the debinding stage, or immediately thereafter, e.g., subsequent powder cleaning to remove remainder powder. Following a removal process, e.g., a solvent or dispersant process, these matrix green body supports may leave behind removable byproducts, such as gases and/or dissolved materials and a powder.

Such composite matrix green body supports may be removed by a different removal processes conducted in different stages. As a non-limiting example, composite matrix green body supports may be made from a two-stage debinding material. In a first stage, a first binder material may be removed, leaving interconnected voids for gas passage during debinding. The first binder material may be melted out (e.g., wax), catalytically removed (e.g., converted directly into gas in a catalytic surface reaction), or dissolved (e.g., in a solvent). A second binder material, e.g., polyethylene, not as responsive to the process used to remove the first material, remains in a lattice-like and porous form, yet may maintains the shape of the 3D printed object awaiting sintering (e.g., before the metal or ceramic particles have been heated to sufficient temperature to begin the atomic diffusion of sintering). This results in a brown part, which includes, or is attached to, the sintering supports. As the part is sintered at high heat, the second binder material may be pyrolyzed and progressively removed in gaseous form.

As described herein, green body supports can shore or provide support to additively manufactured objects up to and through stages of heating towards completing a final part. Green body supports, however, are generally not intended to be used throughout heating or to provide a support and/or shoring structure until final parts are formed. That is, green body supports are dissolved or pyrolyzed before the final parts are processed.

Model Material Supports

Model material support structures may provide removable supporting structures for the additive manufacturing processes through the formation of the final object or part. Such designed and engineered supports may be configured to reduce or eliminate warping, cracking, and tolerance issues due to deformation, sag, or gravitational forces during heating. These supporting and/or shoring structures are not part of the final object, and as such these supports are generally temporary. Such temporary supports are removable, soluble, and/or dispersing.

In metal printing, the metal model material may be dense (e.g., heavy). Removable, soluble, and/or dispersing supports may be helpful to prevent deformation or sagging during processing—for example, to preserve a shape of the object, in particular, to preserve the shape of structural elements or features that extend outward or that curb inward, have cantilevered portions, jutting portions, breaks, gaps, or windows within the model material, or overhangs.

Model material support structures that may be removable from the final object may be used to provide support for additive manufacturing processes. Model material support structures may be additively manufactured of the same model material as that of the part/object material, that is, for example a metal (or ceramic) material. Model material may be additively manufactured in any unique supporting shape to provide a supporting structure. These supporting structures may be useful to reduce or eliminate deforming, sagging or slumping due to gravity and to preserve a shape of the object, in particular, such supports can be useful to aid in preserving unique, specially designed elements and features. For example, supporting structures can be useful to support or shore features that extend outward or that curb inward, cantilevered portions, jutting portions, breaks, gaps, or windows within the model material, or overhangs. Such shoring or supporting structures can be useful to support against deformation, droop, sag, and/or slump with gravity. Many model material structures of varying shapes may be printed and stacked (e.g., one model material support structure on top of another) to geometrically fill any supporting spaces.

As described herein, model material support structures are typically temporary and removable. When assembling an object supported by model material support structures, such structures can be effective if they are removable from any neighboring objects, separate support structures, build chambers (or platens), or combinations thereof. Such objects, structures, chambers, etc. may be relatively positioned to the support structure in any direction along an x, y, or z-axes. For removal of model material support structures, such model material support structures may utilize a release layer including a higher melting temperature or sintering temperature material (e.g., a ceramic, metal, or metal alloy having a higher melting temperature than that of the model material). A model material may tack, that is, form sparse connections between the model material across the interfacing release layer. At the model material sintering temperature, the release layer may powderize, i.e., become powdered. For example, the polymer binder may pyrolyze, but the release layer material will fall apart into powder particles and not sinter. Additionally, the tacking of the model material can be readily broken for ease of separation and removal of the model material layers on either side of the release layer.

The release layer may be additively manufactured (or deposited). The release layer may be applied between objects, supports, chamber(s), or combinations thereof such that if these objects, supports, or chamber(s) are of a same model material (e.g., metal (or ceramic)) the objects, supports, or chamber(s) promote the same level of compaction or densification, e.g., objects, supports, and chamber(s) are uniformly reduced in size, thereby maintaining overall dimensional accuracy. Supports having release layers positioned at an interface between support structures may break into smaller subsections for removal. In some cases, the final sintered support structures may break into smaller subsections in the presence of mechanical agitation or other agitation. Larger supports may be additively manufactured by forming smaller support subsections followed by removal. Supports comprising a plurality of subsections housed in a larger internal cavity can be removed from the internal cavity having a smaller hole provided each of the plurality of subsections is smaller than the hole of the internal cavity.

An exemplary method to promote uniform shrinking using model material support structures, for example, may include printing a ceramic release layer as the bottom most layer in the part, i.e., as a sliding release layer. On top of the sliding release layer a thin sheet of metal may be printed that may uniformly shrink with the part, and thus provide a "shrinking platform" or "densification linking platform" to hold the part and the related support materials in relative position during the shrinking or densification process. Optionally, staples or tacks, e.g., attachment points, may connect and interconnect the model material portions being printed.

Model material supports can shore additively manufactured objects up to and through different stages of heating and the completion of a final part. In combination with rafts, these model material supports can be left at model material sintering temperatures to provide physical or mechanical support to unique, specially designed elements and features and to shore these against deformation, sagging, slumping with gravity, or a combination thereof.

Model material supports may be less than ideal for some support situations. For example, model material supports may be difficult to place with unique structural features, or at least some unique structural features, for example, fine features, windows, openings, cantilevered portions, gaps, overhangs, and other similar features. Some structural features of an object, for example, may require a number, shape, and/or positioning of support structures to provide ideal support; this arrangement, however, may be undesirable for other reasons. Moreover, as described herein, model material supports may be removed when the object is heated to the model material sintering temperature. Release layers positioned as an interface between sections of model material may powderize to aid in removal. Release layers however may be difficult to place. Additionally, release layers may be difficult to accurately remove or, due to tacking, removal of tacked model material supports may cause unintended damage. For example, tooling useful for removal of model material support separately can cause damage to the object.

Current methods of supporting an additively manufactured object that is heated to its sintering temperature generally provide inconsistent support. In particular, objects having unique, specially designed structural elements and features that extend outward or that curb inward, cantilevered portions, jutting portions, breaks, gaps, or windows within the model material, or overhangs of an object could deform, sag, slump with gravity, or a combination thereof, may benefit from a heating process in which supporting and/or shoring structures are less likely to form a final part or object with evidence of cracking, damage, visible warping etc. The present disclosure provides systems, apparatus and methods for uniformly supporting and heating objects during sintering and in particular various stages of sintering using temporary release material and particle-based supports.

Packing Material Particles as a Support

Packing material particles that may be removable from the final object may be used to provide support for additive manufacturing processes. An additively manufactured object, initially a brown part that was made or printed via an extrusion apparatus or a binderjet apparatus, can be shored up or supported with packing material particles, prior to sintering, to provide a supporting and/or shoring structure. Prior to sintering, the packing material particles are added to support and/or shore up the object to reduce or eliminate deformation, sag or slump due to gravity and to preserve a shape of the object, in particular unique, specially designed elements and features that extend outward or that curb inward, cantilevered portions, jutting portions, breaks, gaps, or windows within the model material, or overhangs.

A brown part may be positioned in a volume, such as build chamber (e.g., a crucible) at least partially filled with packing material particles having a particle size, for example, a diameter between about 0.001 microns and about 200 microns. The packing material particles may further have a melting temperature that is higher than that of the sintering temperature of the brown part. That is, a melting temperature of the packing material particles may be a higher temperature than the sintering temperature of the model material, such that the packing material particles retain a fluidized, free-flowing, or loose particle or powder structure at a model material sintering temperature (i.e., at the initial sintering temperature forming a pre-sintered part through final part formation).

As described herein, when such traditional supporting and/or shoring structures are left in place during the entire model material sintering process, certain resultant conditions, for example the brown part shrinking during sintering, may lead to an increased likelihood of cracking or damage to the final part. If the packing material particles are fluidized such that a gas appropriate for sintering (e.g., an inert gas or a reducing gas) enters the volume and flows about, around, and between the particles, the fluid movement of the packing material particles during the sintering process may reduce the risk of cracking or damage to the final part.

Packing material particles can be introduced to the volume, around the object, and about the object. As described herein, the mass and/or density of the object may cause the object to deform downward under gravity, i.e., under the weight of the object itself. These supporting and/or shoring structures aid before and during the sintering process. The packing material particles, such as a fine powder (e.g., alumina) provide resistance to deformation, sag, and slumping with gravity to the unsupported portions of the brown part. A gas flow can be initiated, for example, through a plurality of holes and/or a distributor plate, causing the packing material particles to be suspended in the fluid of the gas flow.

During a sintering process, heat may be applied to the volume (i.e., the build chamber) containing both the object that is to be formed into the final part and the packing material particles. In addition to providing support, the fluidized packing material can also provide buoyancy. Without wishing to be bound by any particular theory, it is believed that the flow of the gas fluidizing the packing material particles minimizes the stress and/or strain during final part sintering. The fluidized packing material particles may promote flow and prevent entrapment of powder in orifices and compartments of the part. The packing material particles may be generally spherically shaped. Packing material particles may be configured to generate buoyancy on the part, on a scale from low buoyancy to neutral buoyancy, effectively creating a zero-gravity sintering process. A mild amount of buoyancy may reduce the effective weight of the object or a portion of the object. However, the buoyancy may be up to neutral (where the object may float within the fluidized bed) or above neutral (where the object may float to the top of the fluidized bed). Such a zero-gravity simulated process may permit complex shapes with internal spans and bridges to be sintered without sagging or slumping.

The fluidizing gas may be maintained at a flow rate below a point of mobility of the packing material particles during an initial temperature ramp, and through an onset of necking or tacking within the model material, among the metal powder spheres in the process of sintering, e.g., the initial stages of the sintering process. Maintaining the fluidizing gas at a flow rate below a point of mobility of the packing material particles can prevent the packing material particles from settling during the formation and/or heating up to sintering temperatures of parts in the volume of the heating apparatus. Maintaining the fluidizing gas at a flow rate below a point of mobility of the packing material particles, for example up to the point of neutral buoyancy, may provide additional support to the fluid medium to further reduce or prevent slumping or collapse of the packing material particles under the mass of the part. When sufficient necking or tacking is achieved to connect many spheres and thereby maintain the structure of the part, the gas flow can be increased to the point of fluidizing the packing material particles. If the packing material particles are fully fluidized (e.g., creating a fluidized bed) during the initial ramp (before necking or tacking), the packing material particles may have a destabilizing effect on the formation of the final part from the object. The destabilizing effect on the final part may increase the likelihood of cracking or damage in formation of the final part. However, once initial sintering or pre-sintering has enabled sufficient part strength (e.g., about 0.1-10% part shrinkage), and before the part has contracted to fully sintered (e.g., about 12-24%, or approximately 20% shrinkage), fluid flow may be increased to fluidize the packing material particles without damaging the part. That is, once the pre-sintered object has been formed, fluid flow may be increased to fluidize the packing material particles without causing damage.

An exemplary process for additively manufacturing an object using fluidizing packing material particles that are removed after formation of the final part may include, for example: additively manufacturing an object of a model material using an extrusion-based three-dimensional printer, including forming green body supports within a build chamber. Debinding the model material object (e.g., within a debinding chamber or within the volume of the printer). The green body supports may be removed during debinding, for example, by dissolving, melting, and/or catalyzing them away. Once debound, the model material is left as a porous brown body structure.

Once a brown body structure is formed, the brown body may be transferred to a sintering chamber or furnace. Alternatively, the sintering furnace may be integrated, for example, with the printer and/or the debinding chamber. The process may include filling or depositing packing material particles within the sintering chamber or furnace. The packing material particles may not sinter at the sintering temperature of the brown body. During sintering, the brown body may uniformly shrink by up to about 20%, from its initial size and/or volume, closing the internal porous structures in the brown body by atomic diffusion. The packing material itself does not sinter, but either resists sag and slumping of spans and overhangs, and/or provides buoyancy for spans and overhangs. If the packing material is fluidized, both the packing material and part may be more uniformly heated by the circulation of the fluidized packing material particles with a gas. The sintered object can be removed from the sintering oven. Some of the packing material particles may remain in internal cavities and can be washed away and/or recovered.

Fluidizing the particle based support may reduce the likelihood or prevent a number of negative effects from impacting production of the three-dimensional object. In some aspects, fluidizing the particle based support may aid in allowing the particles to be distributed into the fine structural features of the part. For example, fluidizing the particle based support may aid in an even distribution of the particle based support around and/or into the structural features of the part, e.g., reduce areas having too little or too much particle based support. Further, in some aspects, fluidizing the particle based support may aid in the removal of stuck or jammed particles from the fine structural features of the part. Without wishing to be bound by any particular theory it is believed that particles from the particle based support that are stuck or otherwise lodged within the fine structural features of the part may cause cracking as the model material densifies to the final three-dimensional object. In further aspects, fluidizing the particle based support may aid in reducing the likelihood of final three-dimensional object becoming warped or otherwise damaged due to the different coefficients of thermal expansion between the material of the particle based support and the model material.

The present disclosure encompasses a recognition that consistently and repeatably supporting and/or shoring up structures produced during an additive manufacturing process can reduce or eliminate warping, cracking, and parts formed outside of specified tolerances. Indeed, the present disclosure encompasses a recognition that final part geometries and shapes may benefit from supporting and/or shoring structures present around or about an object during sintering, regardless of the additive manufacturing process, additive manufacturing apparatus, or choice of the object's model material. For example, these structures provide support to an object at least during and/or through the initial sintering and may reduce or eliminate deformation, sag, or slump due to gravity during sintering.

Particle-Based Supports

In some embodiments, particle-based supports, such as those described herein, may surround a model material object (i.e., a part) to support the model material object and shore it up or support it against deformation, sag, slump with gravity, or combinations thereof during heating.

In some aspects, particle-based supports are positioned about and/or around a model material object for supporting and/or shoring the object. In some aspects, particle-based supports may have a dimension. e.g., a diameter, between about 0.001 microns and about 500 microns. In some aspects, particle-based supports may be made of or formed from a ceramic, high melting temperature metal, or combinations thereof. In some aspects, particle-based supports may be made of or formed from the model material. In some aspects, particle-based supports may be made of or formed from any material compatible with an additive manufacturing process. In some aspects, particle-based supports may be designed, engineered, or chosen to have a melting temperature that is higher than that of the sintering temperature of the model material that makes up the object. In some aspects, the particle-based support may be characterized in that it is at least as rigid as the model material object. In some aspects, the particle-based support may be at least as rigid as the model material object until the pre-sintered object is formed.

In some aspects, such particle-based supports for supporting and/or shoring the object may be temporary in nature, e.g., the particle-based supports may not be a part of the object or the final part. In some aspects, the particle-based supports may be removable from an area about or around the model material object and/or the object is removable from the particle-based supports. In some aspects, temporary particle-based supports may be removable from about or around the model material object and/or the object may be removable from the particle-based supports during heating (e.g., during sintering).

In some embodiments, removing can include for example, first ramping to an initial sintering temperature, followed by a cooling stage (that is, cooling to allow access to the object and particle-based supports), removing the particle-based support at temperature cooler than that of the initial sintering temperature (e.g., by extracting the volume from the furnace and removing the particle-based supports from outside of the furnace), and then ramping to a model material object to a model material sintering temperature.

In some embodiments, removing can include for example, heating an object in a furnace to an initial sintering temperature, removing the object from the particle-based support, removing the object from the volume, and moving the object from the furnace to a second furnace. The second furnace may be heated at a second temperature, the second temperature being the model material sintering temperature.

In some embodiments, removing can include for example, heating an object in a furnace to an initial sintering temperature, removing the particle-based support from about the object without breaking the heat and without substantially cooling the volume (i.e., maintaining the furnace at temperature and/or maintaining the temperature ramp), and heating the object to the second temperature, the second temperature being the model material sintering temperature.

In some embodiments, particle-based supports may be introduced to brown parts (e.g., objects including model material and a binder) to shore up or support fine features, windows, openings, cantilevered portions, gaps, overhangs, or other similar structural features or elements of the object. The particle-based supports provide support against deformation, sagging, slumping with gravity, or a combinations thereof. In particular, the particle-based supports provide support when a temperature of a furnace holding the object liquifies the binder and through the onset of necking among powder spheres in the process of sintering. While not wishing to be bound to a specific theory, it is believed that when sufficient necking is achieved to connect a plurality of spheres of model material powder, the particle-based supports may be removed as the object can support its mass. Moreover, it is further believed that with further increases in temperature, the bulk density of both the model material and the particle-based support increases, whereby the object shrinks. Removal of the particle based supports when sufficient necking is achieved between model material powder particles may reduce cracking or warping in the final sintered three-dimensional object due to differences in particle size, shape, volume fraction, or mismatch of the coefficients of thermal expansion of the model material and the particle-based support. In some aspects, rather than removal of the particle based supports, the particle based supports may be chosen from a material that can soften or deform with increasing temperature such that the particle based supports can compress at or near the necking or pre-sintering temperature of the model material.

In some aspects, particle-based supports may be deposited within a volume holding an object, such as a brown part (e.g., an object including model material and a binder). In some aspects, the particle-based supports provide support to fine features, windows, openings, cantilevered portions, gaps, overhangs, or other similar structural features of the object against deformation, sag, and/or slump with gravity. In some aspects, particle-based supports may be added to a volume containing, housing, or holding an additively manufactured object. In some aspects, the volume may include includes the build chamber, a depositing chamber, or a furnace. In some aspects, after the object is printed within a build chamber, particle-based supports may be added to a volume. In some aspects, "added to a volume" includes particle-based supports being deposited, poured, rolled, or combinations thereof. In some aspects, after an additively manufactured object is formed, it can be moved or transferred from a build chamber to a volume where a particle-based support can be deposited.

In some aspects, an additively manufactured object may be located within a volume that can be heated. In some aspects, such a volume is a furnace. In some aspects, an additively manufactured object may be at least partially surrounded by a particle-based support. In some aspects, when an additively manufactured object is at least partially surrounded by a particle-based support within a furnace and heated to an initial sintering temperature, a pre-sintered object may be formed. As described herein, in some aspects, the pre-sintered object may have sufficient mechanical strength such that the object can be handled and manipulated, but has not yet been heated to form the final part. In some aspects, the pre-sintered object has sufficient mechanical strength such that the particle-based supports can be removed from around and/or about the pre-sintered object without cracking, damaging, or stressing the pre-sintered object.

In some aspects, the particle-based support comprises a pliable particle-based support. Heating to the first temperature may include softening the pliable particle-based support such that it compresses between the part's cantilevered portions, gaps, overhangs, and/or unsupported ranges or spans when pressure is applied by the part at about the first temperature.

In some aspects, particle-based supports may be temporary. In some aspects, particle-based supports that are temporary may be removable during heating and/or sintering of a model material object or part. In some aspects, particle-based supports that are temporary may be removed, for example, after pyrolysis of a polymer-based binder. In some aspects, particle-based supports that are temporary may be removed, for example after initial sintering. In some aspects, particle-based supports that are temporary may be removed, for example after reaching an initial sintering temperature. In some aspects, particle-based supports that are temporary may be removed, for example after forming a pre-sintered object. In some aspects, particle-based supports that are temporary may be removed, for example after onset of necking that connects sphere surfaces of the model material. In some aspects, particle-based supports that are temporary may be removed, for example above the initial sintering temperature. In some aspects, particle-based supports that are temporary may be removed, for example before ramping a temperature to a sintering temperature for the model material. In some aspects, particle-based supports that are temporary may be removed, for example before reaching the sintering temperature for the model material.

In some aspects, particle-based supports may be deposited about and/or around an object in a volume. In some aspects, particle-based supports provide support to the object against deformation, sagging, slumping with gravity, or a combinations thereof. In some aspects, an object shored or supported with particle-based supports can be heated to an initial sintering temperature. In some aspects, at the initial sintering temperature, the object may form a pre-sintered object. In some aspects, once heated to the initial sintering temperature the particle-based supports can be removed from about the pre-sintered object. In some aspects, removing the particle-based supports from about the object may include completely, substantially, and/or at least partially removing the particle-based supports. In some aspects, the pre-sintered object may be heated to a second temperature that is higher than the initial sintering temperature. In some aspects, the second temperature may be the model material sintering temperature. In some aspects, the particle-based support may be removed, substantially removed, or at least partially removed from the volume.

In some aspects, the pre-sintered object located within the volume having the particle-based support removed, substantially removed or at least partially removed therefrom may be heated to the sintering temperature of the model material. The pre-sintered object within the volume (i.e., a furnace) may be heated to the sintering temperature to fully sinter the object to form the final part. Once the final part is formed, it may be extracted from the volume and any excess of the particle-based support can be removed and/or recycled.

Release Material Supports

In some embodiments, release material supports may be deposited, extruded and/or printed during formation of the object to shore or provide support to fine features, windows, openings, cantilevered portions, gaps, overhangs, or other similar structural features or elements of the object. The release material supports may provide support against deformation, sagging, slumping with gravity, or a combinations thereof, and in particular, when a temperature of a furnace holding the object liquifies the binder and through the onset of necking among model material powder spheres in the process of sintering. The release material supports can be designed and engineered such that they do not place undo strain or stress on fine features, windows, openings, cantilevered portions, gaps, overhangs, etc. of the object so that these features are not susceptible to breaking, cracking, fracturing, warping, or combinations thereof.

In some embodiments, release material supports may be configured to surround and support the model material and shore it against deformation, sag, slump with gravity, or a combination thereof. In some aspects, release material supports may not sinter with the model material. Release material supports can include, for example, ceramics, metals having a higher melting temperature than that of the model material, or combinations thereof. In some aspects, such release material supports may be temporary, that is, they are not a part of the object or the final part. Such temporary supports may be removable, for example, after sintering.

In some aspects, release material supports can be designed and engineered. In some aspects, designed and engineered release material supports can be deposited, extruded and/or printed. In some aspects, the object and the release material supports may be heated together in a volume (e.g., a furnace) to a sintering temperature of the model material. In some aspects, at the sintering temperature of the model material, the object may sinter to form the final part. In some aspects, at the sintering temperature of the model material, the release material support may powderize. Specifically, in some aspects, during sintering, the polymer within the release material support may pyrolyze during heating and before reaching the sintering temperature for the model material. During the sintering, in some aspects, the release material support material may not reach its sintering temperature. Instead, when the model material has sintered, the release material support powderizes. In some aspects, the powderized release support material may be removed after the object is sintered, for example, by knocking, shaking, tapping, and/or touching the post-sintered release material support.

Methods

In accordance with another aspect, there is provided a method of additively manufacturing a three-dimensional object with a schematic of an embodiment of a method of this disclosure illustrated in FIG. 1. With reference to FIG. 1, the method may comprise a step 102 of providing a part comprising a model material and one or more binder components within a volume of a heating apparatus as described herein. A particle-based support, e.g., a ceramic, e.g., $Al_2O_3$, may be added to the volume such that the part is at least partially surrounded in step 104. After addition of the particle-based support to the volume to at least partially surround the part, the method may comprise a step 106 of heating the volume to a first temperature. The heating of the volume to the first temperature may include the formation of necks between particles as described herein to connect neighboring particle surfaces of the model material such that a pre-sintered object is formed. The method may further include a step 108 of removing the particle-based support from about the part within the volume using removal techniques as described herein.

In FIG. 1, steps that are enclosed in dashed line boxes are optional steps that may be included in the method. With continued reference to FIG. 1, the method of manufacturing a three-dimensional object may include a step 105 of applying a gas to the particle-based support at a flow rate below a force required to fluidize the particle-based support. With continued reference to FIG. 1, the method of manufacturing a three-dimensional object may include a step 107 of applying a gas to the particle-based support after heating to the first temperature and the formation of a partially solid pre-sintered part at a flow rate that fluidizes the particle-based support. As described herein, the fluidized particle-based support provides a buoyant force to the part as it sinters, reducing the effective weight and minimizing sagging, stress, or strain on the part. With continued reference to FIG. 1, the method of manufacturing a three-dimensional object may include a step 110 of heating the volume and the part therein the part to a second temperature, greater than the first temperature, such that the three-dimensional object is formed. The model material of the part may have a melting temperature that is lower than a melting temperature of the particle-based support, i.e., the particle-based support does not density upon heating to the first and/or second temperatures. With continued reference to FIG. 1, the method further may include a step 112 of collecting the particle-based support after one or both of heating to the first temperature or heating to the first temperature. The particle-based support may be collected in a collection chamber positioned near the furnace such as described herein. With continued reference to FIG. 1, the method further may include a step 114 of removing the formed three-dimensional object from the volume of the heating apparatus.

In some embodiments, methods of forming an additively manufactured object may include heating an additively manufactured object that is at least partially surrounded by a release material support or a particle-based support. In some aspects, methods of forming an additively manufactured object including a release material support may include heating the object to a sintering temperature (and removing the powderized release material support). In some aspects, methods of forming an additively manufactured object may include heating an object to an initial sintering temperature to form a pre-sintered object, removing the particle-based support from about the pre-sintered object, and heating the pre-sintered object to a sintering temperature.

Forming and Supporting Additively Manufacturing Objects for Sintering

In some aspects, methods of forming an additively manufactured object, the object includes model material and a binder. In some aspects, the model material is a powder. In some aspects, the powder-based model material is a metal, ceramic, or combinations thereof. In some aspects, the binder is a polymer. In some aspects, methods include additively manufacturing the object via a binderjet printing. In some aspects, methods include additively manufacturing the object via an extrusion printing.

In some aspects, methods of forming an additively manufactured object may include a step of adding a release material support. In some aspects, methods of adding a release material support may include depositing, extruding, or printing. In some aspects, the release material support may include a ceramic, metal, or combinations thereof. In some aspects, the release material support may include a material having a melting temperature that is higher than that of a model material. In some aspects, the release material support, for example, may be alumina. In some aspects, when the release material support at least partially surrounds the object, the release material support may be sized and configured such that it may fill the object's fine features, windows, openings, cantilevered portions, gaps, overhangs, or other similar structural features or elements. In some aspects, additive manufacturing may include depositing, extruding, or printing a model material from a first print head and depositing, extruding, or printing a release material support from a second print head. In some aspects, additive manufacturing may include co-extruding from a hybrid print head. In some aspects, additive manufacturing may include depositing, extruding, or printing a model material and then depositing, extruding, or printing a release material support from a same hybrid print head.

In some aspects, methods of forming an additively manufactured object may include a step of adding a particle-based support. In some aspects, prior to a step of adding the particle-based support, methods may include a step of forming a brown part. In some aspects, a step of forming a brown part may include depowdering a brown part manufactured by a binderjet additive manufacturing system. Alternatively, in some aspects, a step of forming a brown part may include debinding a green part manufactured by an extrusion-based additive manufacturing system.

In some aspects, methods may include adding particle-based supports around and/or about the object. In some aspects, the volume where the object build occurs may not be the same volume where the addition of the particle-based support occurs. In some aspects, methods of adding a particle-based support may include transitioning or transferring the brown part from the volume defined by the build chamber and the build surface supporting the object. In some aspects, methods may include transitioning, moving, or transferring the brown part to a device for adding a particle-based support. In some aspects, the device for adding the particle-based support may be housed within a volume.

In some aspects, a device for storing and delivering particle-based supports around and/or about the additively manufactured object may not be a separate volume. In some aspects, the additive device may be part of a system. In some aspects, the volume may include and/or be a part of a build chamber. In some aspects, the object may either rest on or may be mounted to the build chamber. In some aspects, the build chamber may be a build platen, build plate, build box, or another similar volumetric structure. In some aspects, the build chamber that is used to additively manufacture an object may also be used as the volume for adding the particle-based support. In some aspects, the build chamber may define a volume configured to hold an additively manufactured object and the particle-based support. In some aspects, when adding a particle-based support with an additive device the object may be supported by or mounted to a build chamber.

In some aspects, the device for storing and delivering particle-based supports around and/or about the additively manufactured object may not be a separate volume and may include and/or be a part of a heating apparatus. In some aspects, the heating apparatus may include a furnace. In some aspects, the volume of the heating apparatus may be a retort furnace.

Additionally, in some aspects, a volume may be configured, designed, and engineered as a build chamber, a device for adding particle-based supports, and a heating apparatus. That is, the build chamber where the part is printed may also be used with the furnace; in this configuration, the handling of fragile parts is minimized during printing and sintering processes. Moreover, in some aspects, a build chamber may be designed and configured to work with an additive manufacturing printing system, an additive manufacturing debinding system, an additive manufacturing sintering furnace system, and combinations thereof.

In some aspects, methods may include transitioning or transferring an object, that is, a brown part, for downstream processing. In some aspects, methods may include transitioning or transferring a brown part to a particle-based support adding volume and/or to a particle-based support adding device. In some aspects, the volume may include point supports. In some aspects, these point supports may resemble cones or have conical structures to aid in locating and holding the brown part in the volume during adding of the particle-based support. These cone-shaped structures may support the brown part but also may permit gas flow and/or access between an underside of the object and a top surface of the volume (e.g., a top surface of the build chamber or furnace, e.g., a retort furnace). In some aspects, the cone-shaped structures may be designed and engineered to extend out of a base of the volume (e.g., the build chamber or furnace, e.g., a retort furnace).

In some aspects, methods may include a step of adding a particle-based support. In some aspects, methods may include a step of adding a particle-based support to a brown part. In some aspects, the particle-based support may include a ceramic, metal, or combinations thereof. In some aspects, the particle-based support may include a material having a melting temperature that is higher relative to that of a model material. In some aspects, the particle-based support may be alumina. In some aspects, the particle-based support may be characterized by its size, e.g., a diameter. In some aspects, the particle-based support may have a cross-section or diameter of about 0.001 microns and about 200 microns. In some aspects, when the particle-based support at least partially surrounds the object, the particle-based support may be sized and configured such that it can fill the object's fine features, windows, openings, cantilevered portions, gaps, overhangs, and other similar structural features or elements.

In some aspects, the particle-based support may be characterized by its shape, including, for example, spherical or bead-like.

In some aspects, the step of adding may include depositing, pouring, rolling, spreading, or combinations thereof. In some aspects, the step of adding may include depositing, pouring, rolling, spreading, or combinations thereof so that the object is supported and/or shored. In some aspects, the step of adding may include depositing, pouring, rolling, spreading, or combinations thereof, such that fine features, windows, openings, cantilevered portions, gaps, and overhangs of the object are supported and/or shored. In some aspects, the step of adding may include depositing, pouring, rolling, spreading, or combinations thereof, such that fine features, windows, openings, cantilevered portions, gaps, and overhangs are supported and/or shored against deformation, sagging, and/or slumping under the force of gravity. In some aspects, the step of adding may include depositing, pouring, rolling, spreading, or combinations thereof, such that the particle based support occupies a volume between a surface of a build chamber and an opposing unsupported surface of an additively manufactured object. In some aspects, the step of adding may include depositing, pouring, rolling, spreading, or combinations thereof, such that the particle based support occupies a volume between a supported surface of model material and an opposing unsupported surface of model material of an additively manufactured object. In some aspects, the step of adding may include depositing, pouring, rolling, spreading, or combinations thereof, such that the particle based support is configured to shore against deformation when at least a portion of model material of the additively manufactured object is unsupported.

In some aspects, adding particle-based support further may include vibrating the particle-based support and/or the volume. In some aspects, the volume is positioned on a vibration table when adding the particle-based supports. In some aspects, adding particle-based support further may include shaking the particle-based support and/or the volume. In some aspects, adding particle-based support further may include tapping and/or impacting the volume (e.g., the build chamber) in which the object is positioned. In some aspects, impacting, shaking, or vibrating the particle-based support may allow more of the particle-based support to be added to the volume.

In some aspects, a step of adding a particle-based support may include actuation of an additive device. In some aspects, an additive device may deliver the particle-based support from a supply. In some aspects, an additive device may include a wand that directs the particle-based support from a supply. In some aspects, the additive device may be a blower, a distributor, or a shower providing the particle-based support to the volume.

In some aspects, adding particle-based support may include filling the volume with the particle-based support characterized by a flow rate. In some aspects, adding particle-based support may include filling the volume with the particle-based support characterized by a pressure. In some aspects, the pressure and flow rate of the particle-based support being added to the volume may be set such that the pressure of the particle-based support or the flow rate of the particle based support does not result in damage to the additively manufactured object.

In some aspects, the step of adding may include initiating and continuing to add a particle-based support until the particle-based support at least partially surrounds the additively manufactured object. In some aspects, the step of adding may include initiating and continuing to add a particle-based support until the particle-based support substantially surrounds the additively manufactured object. In some aspects, the step of adding may include initiating and continuing to add a particle-based support until the particle-based support completely surrounds the additively manufactured object.

In some aspects, methods may include transitioning or transferring an object to a heating apparatus. In some aspects, methods may include transitioning or transferring an object at least partially surrounded with a particle-based support to a heating apparatus. In some aspects, the heating apparatus may be a furnace, for example a sintering furnace. In some aspects, methods may include transitioning or transferring a volume including an object and a particle-based support to a heating apparatus. In some aspects, when the volume is defined by a retort furnace, methods may include installing the retort for heating.

Heating

In some aspects, methods of forming an additively manufactured object may include heating the model material object within the volume. In some aspects, methods of heating may include heating the model material object to an initial sintering temperature and/or heating to a final sintering temperature. In some aspects, when an object is formed with a release material support, the heating can include heating to a final sintering temperature. In some aspects, when an object is formed with particle-based supports, the heating can include heating to an initial sintering temperature in which a pre-sintered object is formed and then a final sintering temperature in which a final part is formed.

In some aspects, a volume is heated. In some aspects, the volume is a furnace. In some aspects, heating includes contact (e.g., resistive) heating through a heated plate. In some aspects, heating may include heating a ceramic plate or wall. In some aspects, heating may include flowing a heated gas throughout a furnace and/or chamber. In some aspects, heating may include, for example, exposing a chamber to radiation, such as microwave radiation.

In some aspects, methods may include ramping to a sintering temperature. In some aspects, methods may include ramping to the initial sintering temperature. In some aspects, the initial sintering temperature may be in a temperature range where the initial stages of sintering are exhibited. In some aspects, the initial stages of sintering may include for example when the object exhibits sufficient necking such that a portion of the spheres powder are connected. In some aspects, the initial stages of sintering may include for example when sufficient necking is achieved to connect spheres of powder for many spheres such that the structure of the object can be retained without the particle-based support. In some aspects, when the structure of the object can be retained without the particle-based support, a pre-sintered object may be formed. In some aspects, the pre-sintered object may be characterized by its strength, e.g., mechanical strength. In some aspects, the pre-sintered object may be capable of supporting itself. In some aspects, the pre-sintered object may be resistant to mechanical handling and manipulation. In some aspects, the pre-sintered object may be stable such that capable of supporting itself such that fine features, windows, openings, cantilevered portions, gaps, and overhangs are supported and/or shored against deformation, sagging, or slumping under the force of gravity. In some aspects, the pre-sintered object may be resistant to mechanical handling and manipulation such that fine features, windows, openings, cantilevered portions, gaps, and overhangs are supported and/or shored against deformation, sagging, slumping under the force of gravity. In some aspects, methods may include ramping to the final sintering temperature. In some aspects, the final sintering temperature may be in a temperature range where the final part is formed.

Removing Release Material Supports

In some aspects, methods of forming an additively manufactured object may include removing the release material supports. In some aspects, methods further may include a step of removing the release material support from about and/or around the sintered object. In some aspects, after the object has been sintered at the model material sintering temperature, the release material support about and/or around the object powderizes for separation. In some aspects, removing the release material support from about the sintered object may include for example probing the powderized release material support that is surrounding the sintered object. In some aspects, the probing step may include use of a tool for digging or extracting the powderized release material support that is surrounding the sintered object. In some aspects, removing the release material support from about the sintered object may include for example knocking, shaking, tapping, and/or vibrating the powderized release material support that is surrounding the sintered object. In some aspects, knocking, shaking, tapping, and/or vibrating the powderized release material support may be helpful to loosen any tacking that is present. In some aspects, removing the release material support from about the sintered object may include transitioning or transferring the sintered object from the heating apparatus.

Removing Particle-Based Supports

In some aspects, methods of forming an additively manufactured object may include removing particle-based supports. In some aspects, methods further may include a step of removing the particle-based support from about the pre-sintered object.

In some aspects, removing the particle-based supports may include removing the particle-based supports while actively cooling the volume. In some aspects, removing the particle-based supports may include removing the particle-based supports while maintaining the temperature at the initial sintering temperature. In some aspects, removing the particle-based supports may include removing the particle-based supports while actively ramping the temperature to the final sintering temperature.

In some aspects, removing the particle-based support from about the pre-sintered object may include blowing, displacing, dumping, or evacuating the particle-based supports from the volume.

In some aspects, the step of removing may include opening one or more ports in a base of the volume. In some aspects, the one or more ports can lead to a secondary chamber, receptacle, repository, or cistern. In some aspects, the secondary chamber, receptacle, repository, or cistern may be below the base of the build chamber and/or furnace. In some aspects, the particle-based support may fall from the volume to the secondary chamber, receptacle, repository, or cistern due to gravity. In some aspects, the one or more ports may be configured to open and close. In some aspects, the opening and closing ports slide open and closed.

In some aspects, removing may include evacuating the particle-based support. In some aspects, evacuating may include use of a vacuum. In some aspects, evacuating may include use of a vacuum knife, a vacuum hose, one or more vacuum holes or ports, or combinations thereof. In some aspects, removing may include opening ports of a vacuum knife, a vacuum hose, one or more vacuum holes, or combinations thereof. In some aspects, evacuating may include displacing the particle-based support through the one or more vacuum openings. In some aspects, the one or more openings may lead away from the build chamber. In some aspects, the one or more openings may lead to a secondary volume away from the build chamber. In some aspects, the particle-based support may be reclaimed from the secondary volume. In some aspects, the vacuum knife, the vacuum hose, the one or more vacuum holes, or combinations thereof may be directed or maneuvered towards or near the particle-based support. In some aspects, the vacuum knife, the vacuum hose, the one or more vacuum holes, or combinations thereof may contact the particle-based support.

In some aspects, the step of removing may include propelling the particle-based support from its position about the pre-sintered object. In some aspects, propelling the particle-based support may comprise accelerating a gas flow at the particle-based support. In some aspects, an accelerated gas may be a compressed gas. In some aspects, a gas may be an inert gas. In some aspects, after a step of propelling or blowing, the propelled particle-based supports may be removed as described herein.

In some aspects, the volume further may comprise a source of vibrational energy. In some aspects, methods further may include vibrating or shaking the build chamber to loosen the particle-based supports from the build chamber. In some aspects, methods further may include impacting the build chamber with an impulse to loosen the particle-based supports from the build chamber.

In some aspects, removing particle-based supports may include removing at least a portion of the particle-based supports before continuing heating to a model material sintering temperature. In some aspects, removing at least a portion of any particle-based supports may include, for example, removing the particle-based supports that are supporting fine features, windows, openings, cantilevered portions, gaps, overhangs, or other similar structural features or elements. In some aspects, removing at least a portion of such particle-based supports may remove or at least may reduce stress to the object caused by coefficient of thermal expansion mismatch during sintering of the model material. In some aspects, for example, a coefficient of thermal expansion may be different for a particle-based support than that of the model material. Thus, in some aspects, a rate of expansion for the particle-based support and the model material during sintering may differ such that the particle-based support may expand within a supporting space at a rate faster than that of the model material thereby causing the model material to crack. In some aspects, removing at least a portion of the particle-based support may allow for expansion such that object and/or its structural features or elements are less susceptible to breaking, cracking, fracturing, warping, or combinations thereof.

Designing and Engineering Particle-Based Supports

In some embodiments, methods of forming an additively manufactured object may include heating an additively manufactured object that is at least partially surrounded by a particle-based support that is designed and engineered. In some aspects, designed and engineered particle-based supports are such that they substantially limit and/or prevent a brown part from deforming and substantially limit and/or prevent cracking and/or damage within a final sintered part.

In some aspects, particle-based supports may be retained around and/or about the additively manufactured object after the pre-sintered object is formed. In some aspects, particle-based supports may be substantially retained about and/or around the additively manufactured object after the pre-sintered object is formed.

In some aspects, particle-based supports may be designed and engineered to change with process conditions. In some aspects, particle-based supports may not structurally interfere with a pre-sintered object after it is formed. In some aspects, particle-based supports may not cause stress or strain to a pre-sintered object after it is formed. In some aspects, particle-based supports may not cause stress or strain such that they do not induce cracking when a pre-sintered object is heated to form a final part. In some aspects, such particle-based supports may be designed and engineered such that they reduce or eliminate an object's susceptibility to break, crack, fracture, warp, or combinations thereof during sintering.

In some embodiments, methods of additively manufacturing an object may include heating an object to an initial sintering temperature where the object is at least partially surrounded by a particle-based support, and sintering the object to the final part. In some aspects, the designed and engineered particle-based supports may be configured such that they provide support to the object at least about until the pre-sintered object is formed. In some aspects, designed and engineered particle-based supports may not interfere with sintering process. In some aspects, designed and engineered particle-based supports may not interfere with the size reduction of the model material during sintering.

In some aspects, particle-based supports may be positioned about and/or around the object. In some aspects, the particle-based supports may be designed and engineered such that at, about, or above the initial sintering temperature of the model material the particle-based supports transition from rigid to soft. In some aspects, the designed and engineered particle-based supports may be compressible relative to the model material. In some aspects, at, about, or above the model material's sintering temperature, when a softer compressible particle-based support is positioned in a model material object's cantilevered portions, gaps, overhangs, and/or unsupported ranges or spans, the softer compressible particle-based support compresses relative to the model material. In some aspects, the step of heating to the sintering temperature softens the particle-based support such that it compresses between the object's cantilevered portions, gaps, overhangs, and/or unsupported ranges or spans when pressure is applied by the object, for example when the object shrinks relative to the particle-based support.

In some aspects, particle-based supports may be positioned about and/or around the object. In some aspects, the particle-based support may be designed and engineered such that at, about, or above the initial sintering temperature of the model material, the particle-based support transitions from resilient to brittle. In some aspects, the designed and engineered particle-based support may be brittle relative to the model material. In some aspects, at, about, or above the model material's sintering temperature, when a brittle particle-based support is positioned in a model material object's cantilevered portions, gaps, overhangs, and/or unsupported ranges or spans, the brittle particle-based support crumbles relative to the model material. In some aspects, the step of heating to the sintering temperature allows the particle-based support to crumble such that it provides no resistance between the object's cantilevered portions, gaps, overhangs, and/or unsupported ranges or spans when pressure is applied by the object, for example when the object shrinks relative to the particle-based support.

In some aspects, particle-based supports may be positioned about and/or around the object. In some aspects, the particle-based support may be designed and engineered such that at, about, or above the initial sintering temperature of the model material, the particle-based support evaporates or sublimates. In some embodiments, methods of additively manufacturing an object may include heating the object to a sintering temperature. In some aspects, the particle-based support may be characterized in that it has an evaporation temperature, a melting temperature, or a sublimation temperature lower than a sintering temperature of the model material. In some aspects, the particle-based support further may be characterized in that it has an evaporation temperature, a melting temperature, or a sublimation temperature higher than an initial temperature of the model material. In some aspects, the particle-based support may evaporate, liquify, and/or sublimate after initial sintering of the model material, i.e., after the model material necks to form the pre-sintered object. In some aspects, the particle-based support may be characterized in that it evaporates, liquifies, or sublimates as the particle-based support approaches the sintering temperature of the object. In some aspects, the particle-based support may be characterized in that it evaporates, liquifies, or sublimates before the particle-based support reaches the sintering temperature of the object. In some aspects, a model material object's cantilevered portions, gaps, overhangs, and/or unsupported ranges or spans may be formed as part of a pre-sintered object before the support evaporates, liquifies, and/or sublimates. In some aspects, the step of heating to the sintering temperature removes the particle-based support such that it provides no resistance between the object's cantilevered portions, gaps, overhangs, and/or unsupported ranges or spans when pressure is applied by the object, for example when the object shrinks relative to the particle-based support.

Systems

In some embodiments, the present disclosure provides systems for additively manufacturing an object. Specifically, the present disclosure provides a heating apparatus defined by a volume configure to heat an additively manufactured object. In some aspects, the object includes a model material, for example, formed from an extrusion process or a binderjet process.

Figure 2:
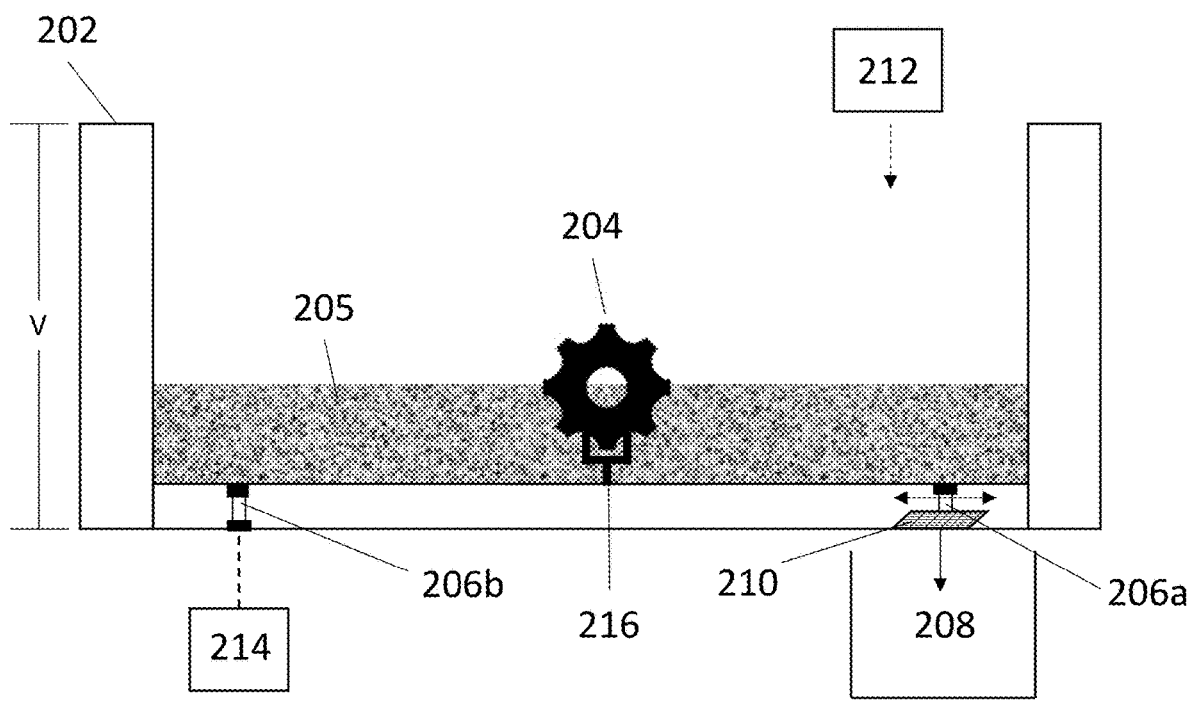
FIG. 2 shows a schematic of a system for producing three-dimensional objects, according to one embodiment described herein.

A schematic of a system of this disclosure is illustrated in FIG. 2. With reference to FIG. 2, system 200 includes a heating apparatus 202, such as a furnace, defined by a volume V in which a part 204, as illustrated a gear having fine structural features, comprising a model material and a binder can be heated. The system 200 further includes a particle-based support 205 disposed within the volume V and configured to at least partially surround and provide support for the part 204 positioned in the volume V; as illustrated, the particle-based support 205 contacts and provides support for teeth of the gear as part 204. The system 200 additionally includes at least one port 206a, 206b integrated within the volume V for removing the particle-based support 205. Positioned beneath at least one port 206a is a secondary chamber 208 in communication with the volume V through the at least one port 206a. As illustrated, a base of the furnace 202 includes a screen 210 recessed from the volume V in communication with the at least one port 206a, with the double arrow indicating that the at least one port 206a is movable such that communication can be established from the volume V through the screen 210 and into secondary chamber 208. The system 200 may further include blower 212 positioned in a manner to direct a gas, such as a compressed gas, onto the particle-based support 205 to direct it towards the at least one port 206a, 206b. In some aspects, the blower 212 may provide a source of gas during operation of the heating apparatus 202, e.g., during sintering, to fluidize the particle-based support 205 as described herein such that the fluidized particles can provide buoyancy to the part 204 during heating or sintering. As illustrated, the system further may include a source of a vacuum 214 operatively coupled to at least one port 206b of the heating apparatus 202. In this configuration, the at least one port 206b comprises one or more vacuum holes. As further illustrated, the part 204 may be connected or attached to a gimbal 216 that permits the part 204 to be rotated within the volume V.

In some aspects, the heating apparatus may be a furnace. In some aspects, the heating apparatus may be capable of heating at least to a sintering temperature of the object. In some aspects, the object may include a model material. In some aspects, the model material may include a metal, ceramic, a metal alloy, or combinations thereof. In some aspects, the volume may be sized to at least surround the object. In some aspects, an object may include a release material support. In some aspects, systems may include a heating apparatus defined by a volume configure to heat an additively manufactured object surrounded by a particle-based support.

In some embodiments, the present disclosure provides systems for adding a particle-based support. In some aspects, prior to heating an object or transferring the object to a heating apparatus, a particle-based support may surround the object. In some aspects, systems for adding a particle-based support may include an apparatus for adding a particle-based support. In some aspects, an apparatus for adding a particle-based support may include a spreader, roller, or other type of applicator suitable for depositing a particle-based support such that the particle-based support may surround and provide support to an object against deformation, sagging, slumping with gravity, or a combination thereof. In some aspects, as described herein, a supported object may be a brown part or green part. In some aspects, an apparatus for adding particle-based support can include a volume fitted for or a part of a heating apparatus. In some aspects, an apparatus for adding particle-based support can include a volume fitted for or a part of a retort furnace. That is, in some aspects, the system for adding the particle-based support can be directly translated and used for heating within a furnace system, thereby reducing handling of a pre-sintered object. In some aspects, the powdering box, is made of, for example, a ceramic or other high temperature material.

In some embodiments, the present disclosure provides systems for removing a particle-based support that surrounds an object. In some aspects, the present disclosure provides systems for removing a particle-based support that surrounds an object during a sintering process. In some aspects, the present disclosure provides systems for removing a particle-based support that surrounds an object after completion of the sintering process. In some aspects, systems may include a vacuum to displace a particle-based support during and/or after sintering without needing to open the heating apparatus to a non-sintering atmosphere. In some aspects, systems having a vacuum may include vacuum attachments. In some aspects, systems can include vacuum attachments such as a vacuum wand or a vacuum knife to aid in targeted removal of particle-based supports. In some aspects, systems may include vacuum holes or ports in a base of the heating apparatus. In some aspects, such holes or ports may lead to a secondary chamber, receptacle, repository, or cistern. In some aspects, the particle-based support can be removed from the volume and sent to such a secondary chamber, receptacle, repository, or cistern through a hole or port in the volume. In some aspects, removal may be gravity assisted. In some aspects, removal may be assisted with a blower that may be configured to blow or push a flow of a compressed gas. In some aspects, a flow of a compressed gas can direct the particle-based supports to the holes and/or ports in the volume.

In some aspects, the holes and/or ports in a volume of a heating apparatus may be located about the volume. In some aspects, there may be a specified number of holes and/or ports located about the volume of the apparatus. In some aspects, the holes and/or ports may be closed or open. In some aspects, for example, holes and/or ports may be closed until the particle-based supports are to be removed. In some aspects, holes and/or ports may be opened by a sliding door, a sliding hatch, or closure otherwise accessible from outside the heating apparatus. In some aspects, a base of the heating apparatus may include a screen. In some aspects, a base screen may include a solid cover or floor. In some aspects, a solid cover or floor above or below or otherwise blocking a screen-base of the heating apparatus may be moved such that the volume of the heating apparatus is opened to a secondary chamber, receptacle, repository, or cistern below. In some aspects, when opened, the particle-based supports may be removed under the influence of gravity. In some aspects, when opened, the particle-based supports may be removed by a compressed gas-based assist, i.e., a volume of compressed gas may be blown onto the object surrounded by the particle-based support to blow the particle-based support free and allow it to drop to the secondary chamber, receptacle, repository, or cistern below the volume. In some aspects, when opened, the particle-based supports may be removed by agitating, e.g., shaking or vibrating, the volume and/or object. In some aspects, agitating, e.g., shaking or vibrating, the volume and/or object may cause the particle-based supports to free from about the object and allow it to drop to the secondary chamber, receptacle, repository, or cistern below the volume.

The phraseology and terminology used herein is for the purpose of description and should not be regarded as limiting. As used herein, the term "plurality" refers to two or more items or components. The terms "comprising," "including," "carrying." "having," "containing," and "involving." whether in the written description or the claims and the like, are open-ended terms. i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third." and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improve- ments are intended to be part of this disclosure and are intended to be within the scope of the invention. Accordingly, the foregoing description and drawings are by way of example only. Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed.

What is claimed is:

1. A method of additively manufacturing a three-dimensional object, comprising steps of:
    providing a part comprising a model material and one or more binder components within a volume of a heating apparatus;
    adding a particle-based support to the volume such that the part is at least partially surrounded, the particle-based support comprising a pliable particle based support;
    heating the part to a first temperature to form a pre-sintered object that possesses at least sufficient strength to retain its printed shape without the particle-based support; and
    removing the particle-based support from about the pre-sintered object.

2. The method of claim 1, further comprising heating the pre-sintered object to a second temperature such that a densified three-dimensional object is formed.

3. The method of claim 1, wherein heating to the first temperature includes forming necks to connect neighboring particle surfaces of the model material.

4. The method of claim 3, further comprising fluidizing the particle-based support around the part such that the particle-based support provides a buoyant force to the part.

5. The method of claim 4, wherein fluidizing the particle-based support occurs following the onset of the necks connecting neighboring particle surfaces of the model material.

6. The method of claim 1, wherein the model material comprises sinterable particles.

7. The method of claim 6, wherein the first temperature is an initial sintering temperature of the model material.

8. The method of claim 1, wherein the model material is characterized by a melting temperature that is lower than a melting temperature of the particle-based support.

9. The method of claim 1, wherein adding the particle-based support includes depositing the particle-based support in the volume such that the particle-based support at least partially surrounds the part to fill gaps, overhangs, cantilevered portions, and/or unsupported ranges or spans of the part.

10. The method of claim 9, further comprising supporting, with the particle based support, the cantilevered portions, gaps, overhangs, and/or unsupported ranges or spans of the part against deformation.

11. The method of claim 10, wherein supporting the cantilevered portions, gaps, overhangs, and/or unsupported ranges or spans of the part against deformation includes supporting against sagging, slumping with gravity under a weight of the part, or combinations thereof.

12. The method of claim 9, wherein the depositing comprises at least one of pouring, spreading, or rolling.

13. The method of claim 12, wherein the depositing further comprises vibrating or shaking the volume.

14. The method of claim 9, wherein depositing the particle-based support permits the particle-based support to occupy a volume between a surface of a build chamber and an opposing unsupported surface of the part or occupy a volume between a supported surface of model material and an opposing unsupported surface of model material.

15. The method of claim 9, wherein heating to the first temperature results in the crumbling of the particle-based support between the pre-sintered object's cantilevered portions, gaps, overhangs, and/or unsupported ranges or spans when pressure is applied by the pre-sintered object at about the first temperature.

16. The method of claim 1, wherein the model material comprises metal particles.

17. The method of claim 1, wherein the one or more binder components comprises a polymer-based binder.

18. The method of claim 1, wherein the particle-based support is a ceramic.

19. The method of claim 1, further comprising applying a flow of gas to the particle-based support at a flow rate lower than a force needed to fluidize the particle-based support.

20. The method of claim 19, wherein the flow of gas is applied to the particle-based support during heating to the first temperature.

21. The method of claim 1, wherein removing the particle-based support comprises vacuuming the particle-based support out of the volume.

22. The method of claim 1, wherein removing the particle-based support further comprises vibrating the particle-based support from about the pre-sintered object.

23. The method of claim 1, wherein removing the particle-based support further comprises propelling the particle-based support from about the pre-sintered object.

24. The method of claim 23, wherein propelling the particle-based support comprises applying a compressed gas to the particle-based support.

25. The method of claim 1, further comprising receiving, with holes and/or ports positioned in a base of the volume, used particle-based support.

26. The method of claim 25, further comprising collecting, using a secondary chamber, receptacle, repository, or cistern positioned beneath or adjacent to the volume and in communication with the holes and/or ports positioned in the base of the volume, used particle-based support.

27. The method of claim 1, wherein the heating to the first temperature includes softening the pliable particle-based support such that it compresses between the cantilevered portions, gaps, overhangs, and/or unsupported ranges or spans of the pre-sintered object when pressure is applied by the pre-sintered object at about the first temperature.

28. A method of additively manufacturing a three-dimensional object, comprising steps of:
    providing a part comprising a model material and one or more binder components within a volume of a heating apparatus;
    adding a particle-based support to the volume such that the part is at least partially surrounded;
    heating the part to a first temperature to form a pre-sintered object that possesses at least sufficient strength to retain its printed shape without the particle-based support, where heating to the first temperature results in the evaporation of the particle-based support; and
    removing the particle-based support from about the pre-sintered object.

29. A method of additively manufacturing a three-dimensional object, comprising steps of:

providing a part comprising a model material and one or more binder components within a volume of a heating apparatus;

adding a particle-based support to the volume such that the part is at least partially surrounded;

heating the part to a first temperature to form a pre-sintered object that possesses at least sufficient strength to retain its printed shape without the particle-based support, where heating to the first temperature results in the sublimation of the particle-based support; and removing the particle-based support from about the pre-sintered object.

30. A method of additively manufacturing a three-dimensional object, comprising steps of:

providing a part comprising a model material and one or more binder components within a volume of a heating apparatus;

adding a particle-based release material to the volume such that the part is at least partially surrounded;

heating the part to a first temperature to form a pre-sintered object that possesses at least sufficient strength to retain its printed shape without the particle-based release material, the particle-based release material powderizing when heated to the first temperature to reduce stress in the pre-sintered object during sintering; and removing the particle-based release material from about the pre-sintered object.

* * * * *